US008125531B2

(12) United States Patent
Van Geel et al.

(10) Patent No.: US 8,125,531 B2
(45) Date of Patent: Feb. 28, 2012

(54) VIDEO SIGNAL COMBINING APPARATUS AND METHOD

(75) Inventors: Martinus Wilhelmus Cornelis Van Geel, Zegge (NL); Evert Van Der Kuijl, Wouw (NL); Marcel Koutstaal, S'Hertogenbosch (NL)

(73) Assignee: GVBB Holdings S.A.R.L., Luxembourg (LU)

(*) Notice: Subject to any disclaimer, the term of this patent is extended or adjusted under 35 U.S.C. 154(b) by 582 days.

(21) Appl. No.: 11/717,344

(22) Filed: Mar. 13, 2007

(65) Prior Publication Data

US 2007/0229708 A1 Oct. 4, 2007

(51) Int. Cl.
*H04N 5/232* (2006.01)
(52) U.S. Cl. ............ 348/218.1; 348/211.99; 348/211.3; 348/211.8; 348/211.11; 348/211.14
(58) Field of Classification Search ............ 348/211.99, 348/211.3, 211.8, 211.11, 211.14, 211.12, 348/218.1
See application file for complete search history.

(56) References Cited

U.S. PATENT DOCUMENTS

| | | | | |
|---|---|---|---|---|
| 5,353,391 A | * | 10/1994 | Cohen et al. | 345/619 |
| 6,366,286 B1 | * | 4/2002 | Hermanson | 345/473 |
| 6,441,844 B1 | * | 8/2002 | Tatsuzawa | 348/42 |
| 6,707,489 B1 | * | 3/2004 | Maeng et al. | 348/211.12 |
| 7,015,954 B1 | * | 3/2006 | Foote et al. | 348/218.1 |
| 2004/0263636 A1 | * | 12/2004 | Cutler et al. | 348/211.12 |

FOREIGN PATENT DOCUMENTS

| EP | 0 438 061 A | 7/1991 |
|---|---|---|
| EP | 0 577 249 A | 1/1994 |

OTHER PUBLICATIONS

JP 63 087869 Patent Abstracts of Japan vol. 012. No. 324 (E-653) & JP 63 087869A (Sharp Corp) 19 Apr. 19, 1998.
Search Report dated Aug. 10, 2006.

* cited by examiner

*Primary Examiner* — Lin Ye
*Assistant Examiner* — Amy Hsu
(74) *Attorney, Agent, or Firm* — Arent Fox, LLP

(57) ABSTRACT

A video signal combining apparatus comprises a video signal processing unit which is adapted to combine an output video image stream from two input image streams from first and second sources by dividing an image area of an image of said output video image stream into two regions and applying to said first region image information from said first source and applying to said second region image information from said second source, and a display unit for displaying at least one of said input and output video image streams, characterized in that the display unit is adapted to display a border between said first and second regions superimposed upon an image from one of said sources.

7 Claims, 4 Drawing Sheets

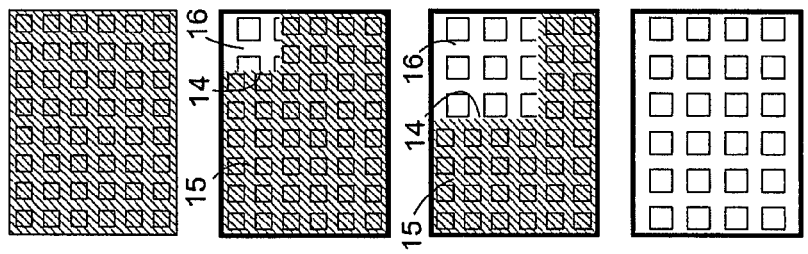
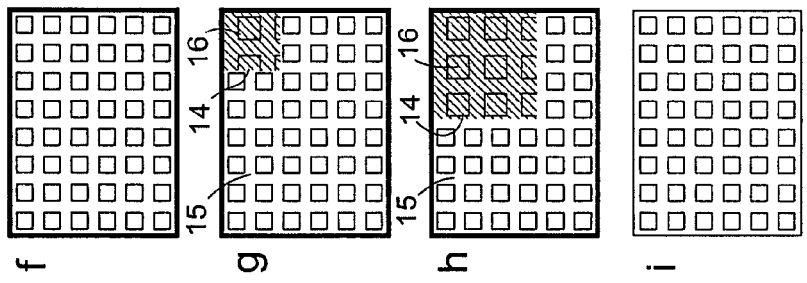
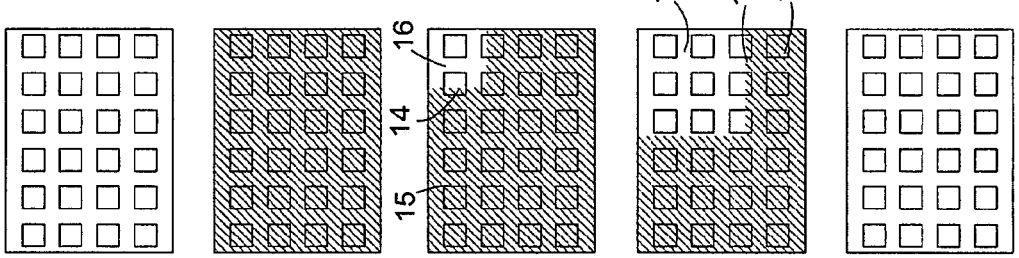
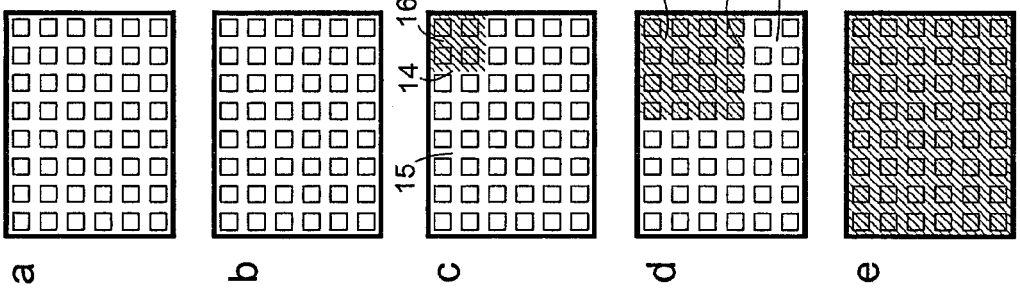
Fig. 4

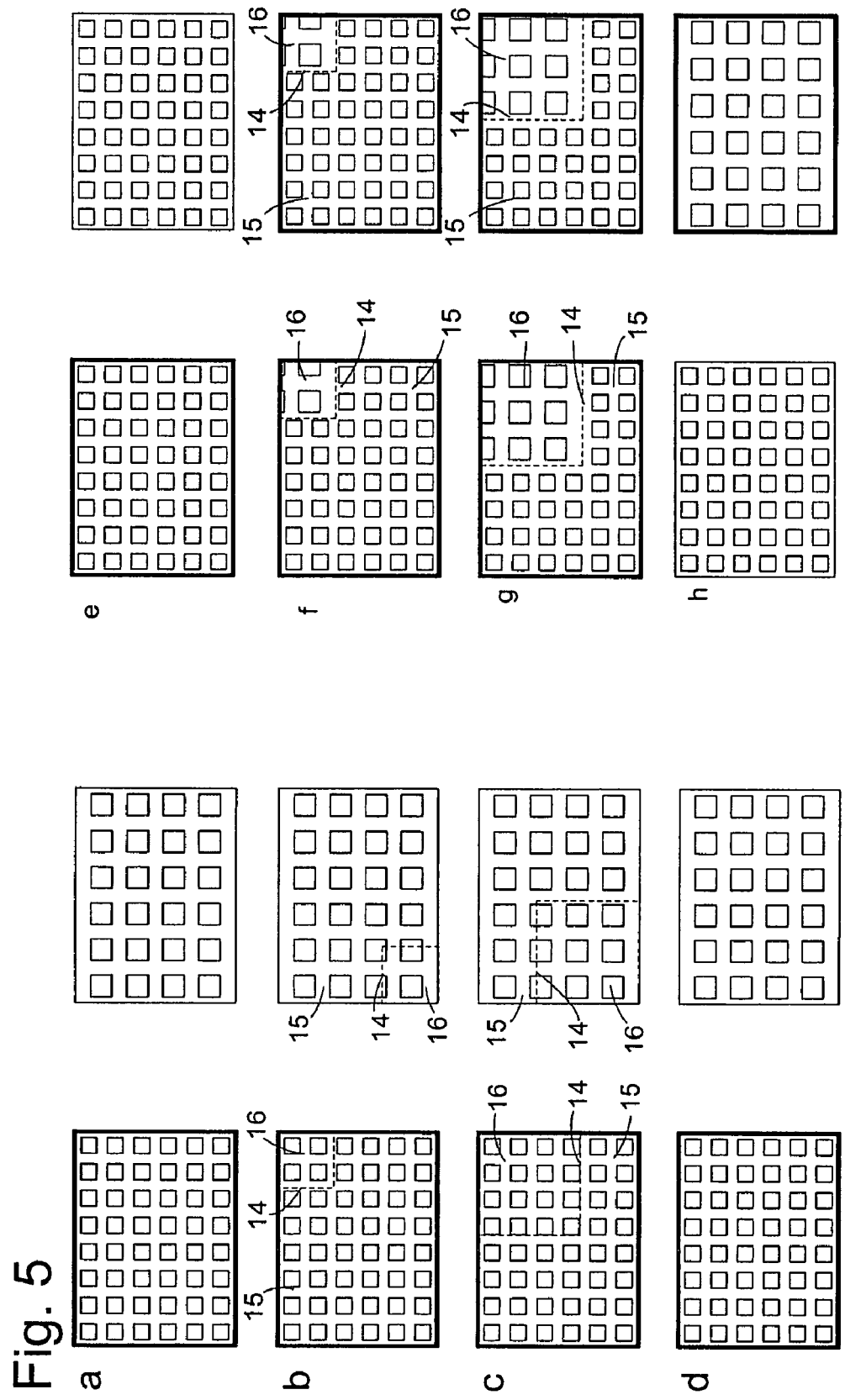

VIDEO SIGNAL COMBINING APPARATUS AND METHOD

This application claims the benefit, under 35 U.S.C. §119 of German Patent Application 06300299.2 filed Mar.29, 2006.

FIELD OF THE INVENTION

The present invention relates to an apparatus and to a method for combining video signals from different sources, in particular from different video cameras.

TECHNICAL BACKGROUND

Conventionally, when an event is being recorded by a plurality of cameras, video signals from the cameras are supplied to a video-mixer, where an operator can watch the various video signals and decide when and how to carry out a switchover from one of the cameras to another. In this way, the video-mixer provides an output signal which, during a first time interval, is derived from a first video camera and during a second time interval, from a second camera.

It is popular to carry out the switchover as a so called "wipe". During the wipe, a border moves through the image of the output video signal, an image portion from the first input video signal being displayed on one side of the border and an image portion from the second input signal on the other. At the end of the wipe, only the second input video signal is output from the mixer. The impression on a viewer is similar to that of a wiper moving across the windscreen of a car.

Such a wipe may be ugly to look at if the composition of the images in the two video signals is inappropriate. Therefore, a wipe cannot be carried out spontaneously, if a switchover from one input signal to another is desired. Rather, conventionally, a producer watches the video signals from the cameras simultaneously and decides when and how to carry out a wipe, and instructs accordingly the persons who operate the video-mixer and the cameras. This requires numerous staff, so that the recording is expensive. Further, since the camerapersons have to be informed of an imminent wipe in order to adapt their views accordingly, it is difficult to carry out a wipe at short notice.

Another problem is that in a live production environment the result of a wipe is irreversible: if it turns out to be ugly, there is no possibility of "rewinding" and trying again.

SUMMARY OF THE INVENTION

The object of the invention is, therefore, to provide a video signal combining apparatus and method by which the probability that a wipe appears ugly can be reduced.

Another object of the invention is to provide a video signal combining apparatus by which the number of staff required for a video production can be reduced.

These and other objects and advantages are achieved by a video signal combining apparatus as defined in claim 1 and a method for switching over an output video image stream from a first input video image stream to a second one as defined in claim 10.

The video signal combining apparatus comprises a video signal processing unit which is adapted to combine an output video image stream from two input image streams by dividing an image area of an image of said output video image stream into two regions and applying to said first region image information extracted from said first video image stream and applying to said second region image information extracted from said second input video image stream, and a display unit for displaying at least one of said input and output video image streams, in which the display unit is adapted to display a border between said first and second regions superimposed upon an image from one of said input video image streams. By having this border displayed, an operator may judge whether the result of the wipe will be satisfactory or not before the wipe is carried out, so that the wipe may be avoided if it is expected to look ugly. Displaying the border superimposed upon an image from one of said input video image streams is useful not only if the superimposed image is viewed by persons who may decide whether or not to carry out the wipe. If it is displayed to a cameraperson he/she is warned of an imminent wipe and may adapt the view of the camera, so that an ugly wipe may be avoided.

To this end, of course, the display unit preferably is a viewfinder of a camera, whereas the video signal processing unit may be remote from the camera.

The border may be displayed in various ways, e.g. as a line between said first and second regions, or by a step between different values of an image characteristic occurring at the border. The image characteristic may e.g. be one of brightness, contrast and colour saturation; i.e. while in the first region, the brightness, contrast or colour saturation may be set at a value which is convenient for continuous viewing, a different value may be set for the second region.

When the display unit for displaying the border is the viewfinder of a camera, the camera is conveniently also equipped with switch means for triggering the wipe procedure and/or for a setting the border to be displayed.

Such switch means enable the cameraperson to trigger the wipe procedure and/or to view the border between the two image regions in order to judge whether a wipe is appropriate or not before actually triggering the wipe.

A method for switching over an output video image stream from a first input video image stream to a second input video image stream, which may be carried out using an apparatus as described above, has a preparatory phase in which the output and first input video image streams are identical, an intermediate phase in which the output video image stream is formed of images having first and second regions, and image information defining the first region of a given image of the output video image stream is extracted from the first input video image stream, whereas image information defining the second region of the said output image is extracted from the second input video image stream, and a final phase in which the output and second input video image streams are identical. In the preparatory phase, a border between said first and second regions is displayed superimposed upon an image from one of said input video image streams, in order to enable an operator to judge whether it is appropriate to switch over or not.

If in the intermediate phase the size of the second region is gradually increased at the expense of the first region, the corresponding displacement of the border between the two regions is preferably displayed in the preparatory phase, so as to enable an operator to judge precisely whether a switchover is going to look acceptable in the output image stream or not.

If the first and second input video image streams are generated by first and second video cameras, respectively, the border is preferably displayed in a viewfinder of said first camera superimposed upon said first input video image stream, and/or is displayed in a viewfinder of said second camera superimposed upon said second input video image stream. In this way, a cameraperson operating one of the cameras can tell from the border appearing in the viewfinder that a switchover is imminent and can adapt the view taken by the camera accordingly. If the camera operator himself caused the border to be displayed, he may judge from the image displayed in the viewfinder whether a switchover is going to look good or not and may then decide to trigger the switchover or not. Since each cameraperson sees the border superimposed upon images taken by his own camera, there is no need to feed back video signals from one camera to the other at least during the preparatory phase.

BRIEF DESCRIPTION OF THE DRAWINGS

Further features and advantages of the invention will become apparent from the subsequent description and the appended drawings.

FIG. 4 is a series of screenshots analogous to those of FIG. 3 according to a second embodiment of the switchover method.

FIG. 5 is a series of screenshots analogous to those of FIG. 3 according to a third embodiment of the switchover method.

DETAILED DESCRIPTION OF PREFERRED EMBODIMENTS

Figure 1:
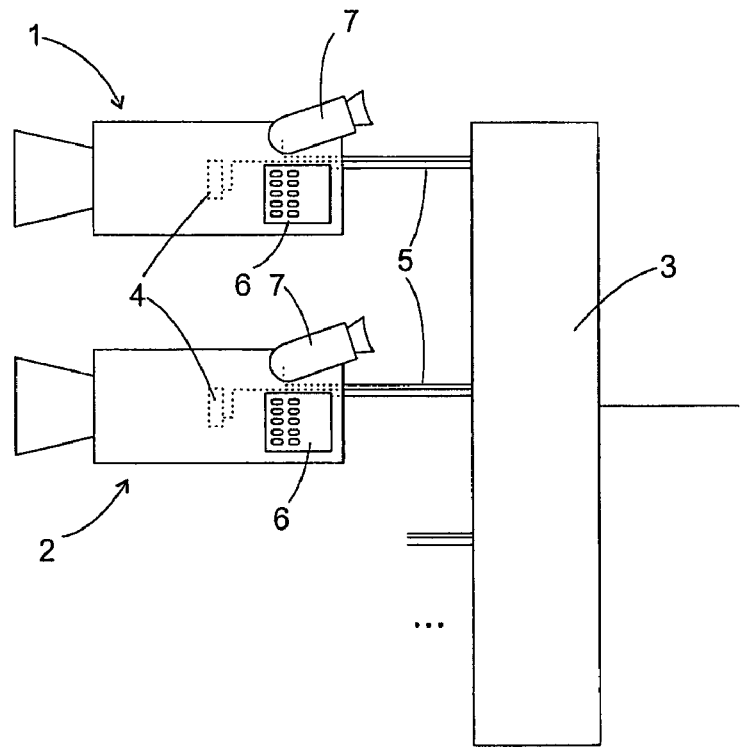
FIG. 1 is a block diagram of video signal combining apparatus according to the invention.

The apparatus of FIG. 1 comprises an arbitrary number of cameras 1, 2 connected to a video mixer 3. Each camera comprises an image sensor 4 which transmits an input video image stream formed of consecutive video images to mixer 3 via a cable 5, a control unit 6 having a plurality of keys for setting an operating mode of the camera 1, 2 and a viewfinder 7 in which the image stream from the image sensor 4 of the camera is displayed.

The control units 6 and the viewfinders 7 of the cameras 1,2 are connected to the video mixer 3 by said cables 5, too, thus enabling the control units 6 to transmit control instructions to the mixer 3 or receive control instructions from it and enabling the viewfinder 7 to play back image information it receives from the mixer 3.

Primarily, the mixer 3 is a switch for selecting one of the input video image streams from the cameras 1, 2 and outputting it as an output video image stream, e.g. to a recording device or to an antenna, not shown, for being broadcast. The mixer 3 is adapted to switch over the output video image stream continuously from a first one of the input streams originating e.g. from camera 1 to a second one of the input streams originating e.g. from camera 2 by dividing the image area into first and second regions and extracting each pixel of the first region of an output image from an image of the first input stream and each pixel belonging to the second region from an image of the second input stream. By continuously increasing the size of the second region at the expense of the first one, the output image stream, which initially was identical to the first input stream, gradually becomes identical to the second one.

This kind of switchover is also known in the art as a "wipe".

Control means for triggering a wipe and for setting its parameters such as duration, the starting point of the second region and its way of growing may be provided at the video mixer 3, where they can be handled by a mixer operator. According to the invention, such control means are provided in the control units 6 of the video cameras 1, 2, in addition to or instead of those at the mixer 3. By transmitting wipe parameters and, eventually, a wipe command from the control unit 6 to the video mixer 3, a mixer operator can be dispensed with.

Figure 2:
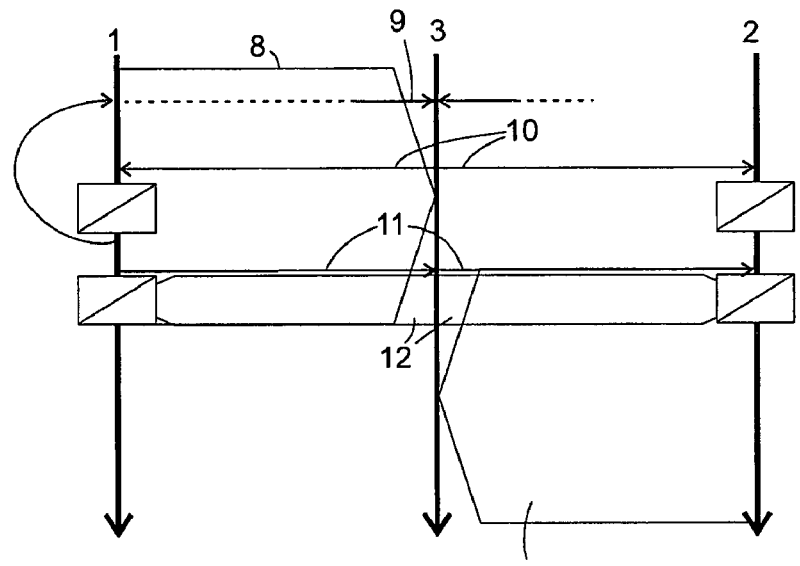
FIG. 2 illustrates a typical switchover procedure carried out with the apparatus of FIG. 1.

FIG. 2 is an outline of the communication between the cameras 1, 2 and the video mixer 3 during a wipe. It is assumed that initially, the video image stream output by mixer 3 originates from camera 1, symbolized in FIG. 2 by a broad arrow 8 extending from a line representing camera 1 to a line representing mixer 3, the width of which arrow 8 is representative of the time interval in which the output of mixer 3 is derived from camera 1.

At an arbitrary instant of this time interval, the video mixer 3 receives a wipe test request 9 from one of the cameras connected to it. It will be assumed in the following that the request originates from camera 1, but it is understood that any other camera might submit the request, too. The request defines the target camera of the wipe, i.e. the camera whose image stream will be output from mixer 3 once the wipe has been carried out, the duration of the wipe, the initial location of the second region and its type of growth.

The mixer 3 communicates the request to the cameras concerned by messages 10, which also specify the parameters of the wipe. Based on these parameters, each camera 1, 2 calculates how the border between first and second image regions will move if the wipe is actually carried out and displays the moving border in its viewfinder 7, superimposed upon the view which is currently being taken by the camera. Thus, a cameraperson who handles camera 1 and caused it to transmit the wipe test request 9 can estimate the effects the wipe would have on the view which is currently being taken by camera 1 and may eventually select a view which is better suited. Similarly, the cameraperson handling target camera 2 can tell from the border displayed in his viewfinder that his camera is a target of a switch request and that the view he is shooting will eventually soon be on the air.

When the cameraperson of camera 1 is satisfied with the wipe test, he/she may cause the camera 1 to send a wipe command 11 to the mixer 3. The mixer 3 forwards the wipe command 11 to camera 2. By sending and receiving the wipe command 11, the cameras 1, 2 are enabled to receive the output image stream 12 from the video mixer 3, which will be displayed in the viewfinders 7 of the cameras 1, 2 during the switchover. When the switchover is complete, only the video image stream from camera 2, represented by broad arrow 13, is output by video mixer 3.

Figure 3:
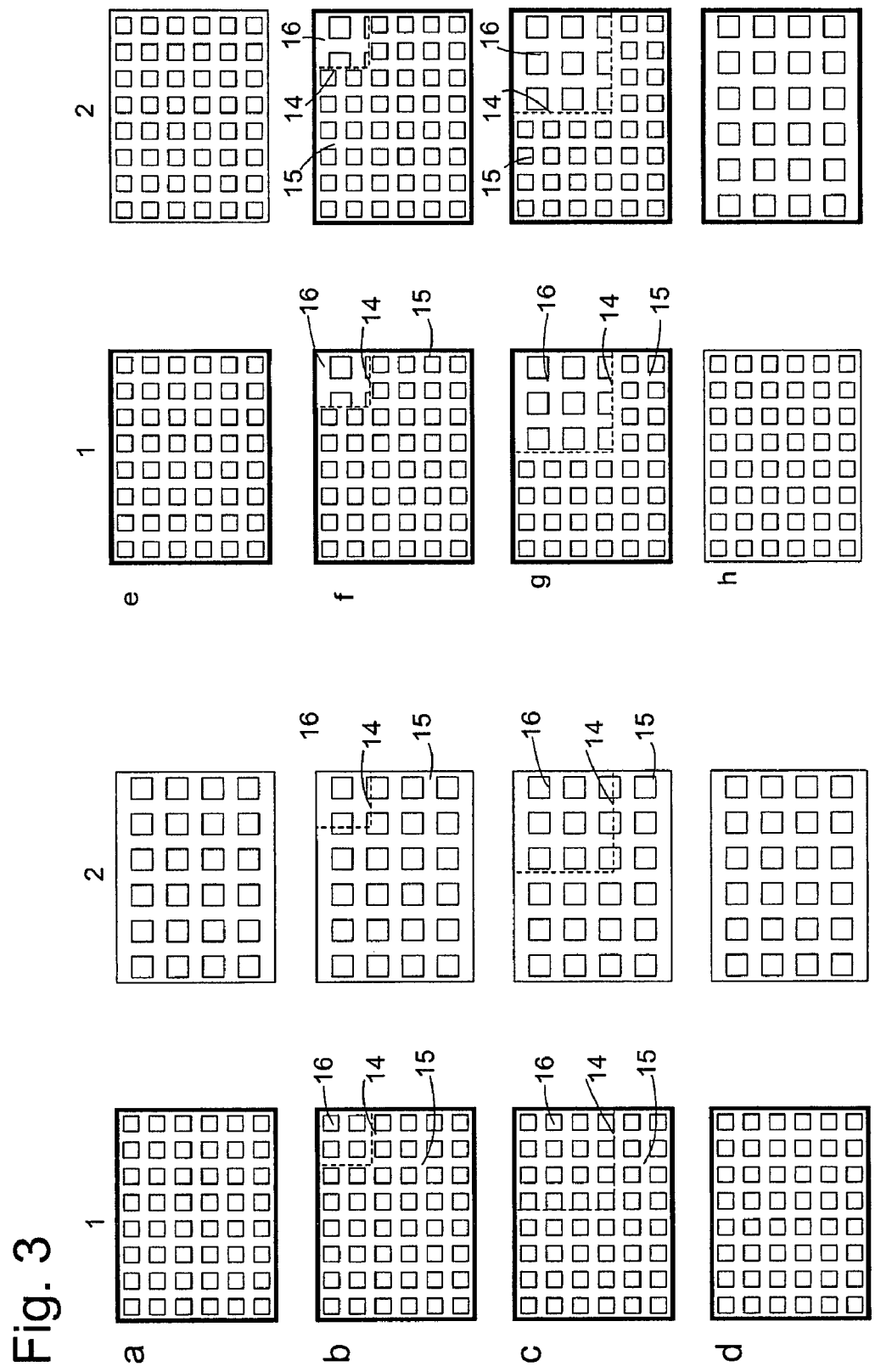
FIG. 3 is a series of schematic screenshots from the viewfinders of the cameras in the apparatus of FIG. 1 according to a first embodiment of a switchover method.

FIG. 3 is a series of schematic representations of what is seen in the viewfinders 7 of cameras 1, 2 during the procedure of FIG. 2, according to a first embodiment of the invention. In each section of the FIG., the left image corresponds to camera 1, and the right image corresponds to camera 2. A thick outline drawn around an image frame indicates that the corresponding camera provides or contributes to the output image stream at the instant concerned.

The squares of different sizes shown in the image frames of FIG. 3 must not be construed as objects seen by the cameras, but merely as patterns which indicate the origin of the particular image region shown: if the region is filled by small squares, it originates from camera 1, if it is filled with large squares, it originates from camera 2.

Section a) of FIG. 3 corresponds to an instant in time before a wipe test request is transmitted. As can be recognized based on the above explanations, camera 1 is the only source of the output image stream, and each viewfinder 7 displays the scene which is being shot by the camera to which it belongs.

Section b) corresponds to an instant in time shortly after a wipe test request has been notified to the cameras 1, 2 by the message 10. The request specifies that the second region 16 will be a square which starts to grow from the upper right corner of the viewfinder screen. In each viewfinder, the border 14 between first and second regions 15, 16 is shown superimposed onto the scene which is observed by the camera to which the viewfinder belongs, the scene remaining visible in first and second image regions 15, 16. In stage c) the second image regions 16 have grown larger in both viewfinders. By watching the second region 16 grow, the camerapeople at cameras 1, 2 can tell how the wipe will affect the views they are shooting and whether it is appropriate to change the view in order to make the wipe look good in the output image stream.

When the border 14 has moved across the entire viewfinder screen in stage d, the viewfinders look the same as in stage a again.

When a cameraperson decides to carry out a wipe from camera 1 to camera 2 and sends the wipe command 11, the output image stream begins to be downloaded to cameras 1, 2, so that in a first instant of the wipe, shown in section e), the viewfinder of camera 2 displays the scene taken by camera 1. The viewfinder of camera 1 also displays the output image stream, but since in stage e), the output image stream is provided by camera 1 alone, the scene which is shown in the viewfinder is the same as before.

Subsequently, the border 14 between a first image region 15 displaying the view of camera 1 and the second image region 16 displaying the view of camera 2 propagates across the screens of both viewfinders, as shown in sections f), g). When the wipe is finished, in stage h), the mixer 3 ceases to transmit the output image stream to the two viewfinders 7, and these display again the scenes viewed by their respective cameras.

FIG. 4 shows a series of viewfinder screenshots from cameras 1, 2 according to an alternative embodiment of the method. The initial situation, shown in section a) of FIG. 4, is the same as in section a) of FIG. 3. When the video mixer 3 receives a wipe test request from camera 1 which is currently providing the output video stream of the mixer 3 or from camera 2 which would provide the output video stream when the wipe has been carried out, the image shown in the viewfinder of camera 2 is modified, as indicated by hatching in section b). The modification can be of any type that affects the entire area of the image, e.g. the image may become darker, it may turn from colour to black and white, or the like.

Subsequently, as shown in stages c) and d), the image area is split into first and second regions 15, 16, the second region 16 expanding continuously all over the viewfinder until it occupies the entire image area in stage e). In the viewfinder of camera 1, the second image region is modified in the same way as was the entire viewfinder image of camera 2 in stage b, whereas in the viewfinder of camera 2, the second image region 16 is displayed normally again. In this way, it is evident for the camerapersons at any time which one of the two regions 15, 16 that they can see in their viewfinder will be present in the output image stream during the wipe. Nevertheless, they can still see the entire field of view of their camera during the wipe test.

When a wipe is actually started in stage f) of FIG. 4, the viewfinders 7 of the cameras 1, 2 begin to receive the output image stream from mixer 3. Camera 1, initially being the only source of the output image stream, displays it normally, whereas camera 2 applies to it the same modification as during the wipe test. Again, the image area in the viewfinders is divided into first and second regions, and the second region, now carrying image information from camera 2, expands continuously, as shown in stages g) and h), until it fills the entire viewfinder screen. When this happens, the wipe is finished, camera 2 has become the only source of the output image stream, mixer 3 ceases to feed back the output image stream to the viewfinders 7, and these display the field of view of their respective cameras again, as shown in stage i).

FIG. 5 illustrates a third embodiment of the switchover method. The initial situation, show in section a), is the same as in FIGS. 3 and 4. When a wipe test is carried out, in the viewfinder of camera 1, a border 14 between first and second image regions 15, 16, propagates from the upper right corner across the entire viewfinder screen, as shown in sections b) and c). In the viewfinder of camera 2, however, the border 14 propagates in the opposite direction, starting from the lower left corner. In this way, the camera person who operates camera 1 can tell that if a wipe is carried out with the parameters set for the wipe test, the view taken by camera 1 will gradually be superseded by the view from camera 2 in the output image stream, starting at the upper right corner, whereas the cameraperson operating camera 2 can see that the lower left corner of the view taken by camera 2 will be the first to appear in the output image stream during the wipe.

After the wipe test, as shown in section d), the screens of both viewfinders appear the same as at the beginning, in section a).

As in the case of FIG. 3, when the wipe is started, the output image stream is fed back to both viewfinders, as shown in section e). As can be seen in sections f), g), the view taken by camera 2 gradually moves across the screen, i.e. objects viewed by camera 2 move across the screen, whereas those viewed by camera 1 remain stationary. When the images from camera 1 have been superseded completely by those from camera 2 in the output image stream, the wipe is finished, and the view finders revert to normal operation, as shown in section h).

The invention claimed is:

1. A video signal combining apparatus comprising:
a video signal processing unit which is adapted to combine an output video image stream from first and second input image streams by dividing an image area of an image of said output video image stream into two regions and applying to said first region image information extracted from said first video image stream and applying to said second region image information extracted from said second input video image stream,
a first camera providing said first input video image stream and a second camera providing said second input video image stream, each camera having a view finder for displaying at least one of said input and output video image streams and a control unit having first switch means for triggering a wipe procedure and second switch means for setting the border to be displayed in the view finder, wherein
the control unit of each camera is coupled to said video signal processing unit to transmit control instructions to said video signal processing unit for initiating the wipe procedure or receive control instructions from said video signal processing unit for implementing the wipe procedure initiated by another camera, the video signal processing unit is adapted to generate the combined output video image stream in an intermediate phase of the wipe procedure, after a wipe command, at the beginning of which the output video image stream is identical to one of said input video image streams and at the end of which it is identical to the other one of said input video image streams, and each view finder is adapted to display a border between said first and second regions superimposed upon an image from one of said input video image streams at a time prior to the wipe procedure, after a wipe test request from a camera person operating one of the cameras, to allow said camera person to judge whether the result of the wipe procedure is satisfactory or not before the wipe procedure is carried out.

2. The apparatus of claim 1, wherein said border is displayed by an image characteristic being set at different values in said first and second regions, said image characteristic being one of brightness, contrast, or colour saturation.

3. A method for switching over an output video image stream from a first input video image stream generated by a first camera to a second input video image stream generated by a second camera, wherein in a preparatory phase of the method, the output video image stream is identical to said first input video image stream;

in an intermediate phase of the method, a wipe procedure is performed after a wipe command in that the output video image stream is formed of images having first and second regions, and image information defining the first region of a given image of the output video image stream is extracted from the first input video image stream whereas image information defining the second stream is extracted from the second input video image stream, and wherein in said intermediate phase the output video image stream is transmitted to at least one of the cameras and is displayed in the viewfinder thereof, and in a final phase of the method, the output video image stream is identical o said second input video image stream;

and wherein in said preparatory phase, after a wipe test request defining a target of a wipe procedure from a camera person operating one of the cameras, a border between said first and second regions is displayed in a viewfinder of said first camera superimposed upon said first input video image stream, and/or is displayed in a viewfinder of said second camera superimposed upon said second input video image stream, to allow the camera person judging the image displayed in the viewfinder before triggering the wipe procedure by using first switch means of said camera.

4. The method of claim 3, wherein in said intermediate phase the border is displaced, whereby the size of the second region is gradually increased at the expense of the first region, and the displacement of the border is displayed in the preparatory phase.

5. The method of claim 4, wherein in said intermediate phase the image content of at least one of said first and second video image streams is displaced in synchronism with the border.

6. The method of claim 4, wherein in said intermediate phase the image content of at least one of said first and second video image streams is stationary while the border is displaced.

7. The method of claim 3, wherein a command for entering the intermediate phase and/or a command for entering the preparatory phase is input at one of said cameras.

* * * * *